US012247122B2

(12) United States Patent
Pupovac

(10) Patent No.: US 12,247,122 B2
(45) Date of Patent: Mar. 11, 2025

(54) POLYCARBONATE BLEND HAVING REDUCED DISTURBING NOISE

(71) Applicant: Covestro Deutschland AG, Leverkusen (DE)

(72) Inventor: Kristina Pupovac, Düsseldorf (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 17/996,636

(22) PCT Filed: May 11, 2021

(86) PCT No.: PCT/EP2021/062398
§ 371 (c)(1),
(2) Date: Oct. 20, 2022

(87) PCT Pub. No.: WO2021/233727
PCT Pub. Date: Nov. 25, 2021

(65) Prior Publication Data
US 2023/0220196 A1    Jul. 13, 2023

(30) Foreign Application Priority Data
May 18, 2020    (EP) .................................... 20175182

(51) Int. Cl.
| | |
|---|---|
| C08L 69/00 | (2006.01) |
| B29C 48/00 | (2019.01) |
| C08F 2/02 | (2006.01) |
| C08F 2/22 | (2006.01) |
| C08F 220/18 | (2006.01) |
| C08F 279/04 | (2006.01) |
| C08J 3/12 | (2006.01) |
| C08J 3/22 | (2006.01) |
| C08L 23/0869 | (2025.01) |
| C08L 51/04 | (2006.01) |
| C08L 55/02 | (2006.01) |
| C08L 83/04 | (2006.01) |

(52) U.S. Cl.
CPC ............ C08L 69/00 (2013.01); B29C 48/022 (2019.02); C08F 2/02 (2013.01); C08F 2/22 (2013.01); C08F 220/1804 (2020.02); C08F 279/04 (2013.01); C08J 3/12 (2013.01); C08J 3/226 (2013.01); C08L 23/0869 (2013.01); C08L 51/04 (2013.01); C08L 55/02 (2013.01); C08L 83/04 (2013.01); C08L 2203/30 (2013.01); C08L 2205/025 (2013.01); C08L 2205/035 (2013.01)

(58) Field of Classification Search
None
See application file for complete search history.

(56) References Cited

U.S. PATENT DOCUMENTS

| | | |
|---|---|---|
| 3,553,167 A | 1/1971 | Hermann et al. |
| 3,644,574 A | 2/1972 | Winston et al. |
| 4,013,613 A | 3/1977 | Abolins et al. |
| 4,075,173 A | 2/1978 | Maruyama et al. |
| 4,097,446 A | 6/1978 | Abolins et al. |
| 4,311,832 A | 1/1982 | Gutnick et al. |
| 4,334,053 A | 6/1982 | Freitag et al. |

(Continued)

FOREIGN PATENT DOCUMENTS

| | | |
|---|---|---|
| CA | 1173998 A | 9/1984 |
| CA | 3019651 | * 11/2017 |
| CN | 107353617 A | 11/2017 |
| DE | 2232877 A1 | 1/1974 |
| DE | 3832396 A1 | 2/1990 |

(Continued)

OTHER PUBLICATIONS

Rerat; Dow Corning HMB-1903 Masterbatch brochure (2018) pp. 1-19. (Year: 2018).*
Schnell, H., Chemistry and Physics of Polycarbonates, Interscience Publishers, New York 1964, pp. 28 ff.
International Search Report, PCT/EP2021/062398, date of mailing: Jun. 9, 2021, Authorized officer: Michael Hoffmann.

(Continued)

Primary Examiner — David J Buttner
(74) Attorney, Agent, or Firm — John E. Mrozinski, Jr.

(57) ABSTRACT

The present invention relates to a moulding compound containing: A) at least one polymer selected from the group consisting of polycarbonate and polyester carbonate; B) a polymer containing B1) at least one rubber-modified vinyl (co)polymer containing B1.1) 80 to 95 wt. %, based on B1, of at least one vinyl monomer and B1.2) 5 to 20 wt. %, based on B1, of one or more rubber-elastic polybutadiene-containing graft foundations, wherein B1 contains polybutadiene-containing rubber particles, which are grafted with the vinyl monomers B1.1 and contain inclusions of vinyl(co)polymer consisting of the vinyl monomers B1.1, and a vinyl(co)polymer matrix which consists of the vinyl monomers B1.1 and is not bonded to these rubber particles and not enclosed in rubber particles, and optionally B2) further rubber particles, grafted with vinyl monomers, from B2.1) 5 to 75 wt. %, based on B.2, of at least one vinyl monomer grafted onto B2.2) 25 to 95 wt. %, based on B2, of one or more rubber-elastic graft foundations, wherein the weight ratio of the components B1 to B2 is at least 5:1; C) a master batch, which is solid at room temperature, containing C1) one or more copolymers containing structural units derived from an olefin and structural units derived from a polar comonomer; C2) a vulcanised silicone elastomer. The invention also relates to a method for preparing the moulding compound, to the use of the moulding compound for producing moulded bodies, and to the moulded bodies themselves.

13 Claims, No Drawings

(56) References Cited

U.S. PATENT DOCUMENTS

| | | | |
|---|---|---|---|
| 4,584,360 A | 4/1986 | Paul et al. | |
| 9,309,390 B2 | 4/2016 | Mochizuki et al. | |
| 9,353,249 B2 | 5/2016 | Mochizuki et al. | |
| 9,777,147 B2 | 10/2017 | Mochizuki et al. | |
| 10,487,164 B2 | 11/2019 | Nagasaka et al. | |
| 10,844,182 B2 | 11/2020 | Seidel et al. | |
| 2006/0004154 A1* | 1/2006 | DeRudder | C08F 279/04 |
| | | | 525/469 |
| 2019/0119491 A1* | 4/2019 | Seidel | C08L 67/03 |
| 2021/0095119 A1* | 4/2021 | Seidel | C08F 279/02 |

FOREIGN PATENT DOCUMENTS

| | | |
|---|---|---|
| GB | 1552558 A | 9/1979 |
| WO | 2018122140 A1 | 7/2018 |
| WO | 2019195516 A1 | 10/2019 |
| WO | WO2019/185627 * | 10/2019 |

OTHER PUBLICATIONS

Dow High Performance Organosilicon Business Unit makes its Debut at CHINAPLAS 2018 Exhibition, and Launches Innovative Noise Reducing Additives for Automotive Interiors for the First Time, China Plastics, p. 115.

* cited by examiner

POLYCARBONATE BLEND HAVING REDUCED DISTURBING NOISE

CROSS REFERENCE TO RELATED APPLICATIONS

This application is a national stage application under 35 U.S.C. § 371 of PCT/EP2021/062398, filed May 11, 2021, which claims benefit of EP application No. 20175182.3, filed May 18, 2020, both of which are incorporated herein by reference in their entireties.

FIELD OF THE INVENTION

The present invention relates to a thermoplastic molding compound containing polycarbonate and/or polyestercarbonate, rubber-modified vinyl (co)polymer and a polyorganosiloxane masterbatch, to a process for producing the molding compound and to the use of the molding compound for producing molded articles and to the use of the molded articles produced.

BACKGROUND OF THE INVENTION

Polycarbonate blends have been known for a long time and are used in many areas of application. Properties may be varied over wide ranges and thus adapted to the requirements of the component to be manufactured through selection of the blend partners, possible further additives and the respective proportions of the components. A large area of application is vehicle construction, in particular the manufacture of automobiles and means of public transport such as buses and trains.

The topic of noise quality is of great importance in the vehicle industry. The development both of complete vehicles and supplier parts is subject to increasing noise requirements, which must be defined, implemented and documented by the relevant manufacturers. In electric vehicles in particular, the demand for lighter weight increases design problems in preventing noise.

The stick-slip phenomenonrefers to the stick-slip of two solid bodies moving against one another. This phenomenon occurs when a body whose static friction is significantly greater than its sliding friction (kinetic friction) is moved. Creaking or squeaking is a friction-induced noise caused by relative motion resulting from the stick-slip phenomenon between the interface surfaces. The elastic deformation of the two contact surfaces stores energy that is released when static friction exceeds sliding friction. The release of energy creates a vibration of the surfaces to produce audible squeaking noises in the range of 200-10000 Hz which are particularly noticeable in vehicle interiors and are often used as an indicator of poor construction quality.

Various techniques to eliminate or minimize these noises include: attaching anti-squeak surfaces or graining, though this is not possible on all surfaces, changing the component geometry (tool adjustment necessary), applying anti-squeak coating or using suitable lubricants, felt strips or foam seals (technically feasible but associated with additional costs and operations) or even changing the material (selection of other material pairings if possible with regard to profile of properties).

It was desirable to avoid a fundamental change of material, tool adaptation and additional operations. In addition to the design approaches mentioned and a fundamental change in material, there are therefore numerous disclosures of modifications to thermoplastic molding compounds with various additives which are intended to bring about a noise reduction.

EP 2 752 454B1 discloses a thermoplastic resin composition for noise reduction containing a rubber-reinforced vinyl resin obtained by polymerizing a vinyl monomer in the presence of an ethylene-α-olefin rubber polymer having a melting point of 0° C. or higher and a silicone oil, wherein the amount of silicone oil based on the silicon present in the thermoplastic resin composition is 0.15% by mass or less based on 100% by mass of the thermal resin composition.

EP 2 610 307A1 discloses PC compositions containing 35-80 parts by mass of polycarbonate and 20-65 parts by mass of rubber-reinforced vinyl resin which is obtained by polymerization of a vinyl monomer in the presence of an ethylene-α-olefin rubber polymer having a melting point of 0° C. or higher, wherein the amount of ethylene-α-olefin rubber polymer based on 100% by mass of the PC composition is 5-30% by mass.

EP 2 418 246A1 discloses automotive interior parts based on thermoplastic resin compositions produced by incorporating 0.1-8.0 parts by mass of a silicone oil having a kinetic viscosity at 25° C. of 10-100 000 cSt into 100 parts by mass of a rubber-reinforced vinyl resin containing a diene rubber and an ethylene-α-olefin rubber polymer, wherein the total amount of diene rubber and ethylene-α-olefin rubber polymer is 5-30% by mass based on 100% by mass of rubber-reinforced vinyl resin and the mass ratio of diene rubber to ethylene-α-olefin rubber polymer is 1-85: 90-15.

WO 2019/195516 A1 discloses PC/ABS composition (A) containing a masterbatch (B) which contains one or more thermoplastic organic materials (B1), a silicone elastomer (B2) and/or an uncured organopolysiloxane polymer (B3), wherein in the masterbatch (B) altogether 20% to 60% by weight of the components (B2)+(B3) are present based on the weight of (B1)+(B2)+(B3) and the thermoplastic elastomer composition contains altogether 0.2% to 25% by weight of crosslinked silicone elastomer.

In this disclosure, the masterbatch is used as an additive for noise reduction in a commercially available polycarbonate/ABS composition.

However, despite the various disclosed options for noise reduction, there remained a need for further improvements. In particular, it was desirable to provide molding compounds which exhibit only a very low level of creaking noises even under highly unfavorable conditions. Thus for example a slow motion of the parts coupled with high opposing forces results in particularly high noise levels which cannot be reduced with known combinations of additive and thermoplastic.

In modern vehicle construction components made of different material classes often come into contact. It was therefore also desirable to provide a molding compound which has a low propensity for noise even in contact with different thermoplastics.

DETAILED DESCRIPTION OF THE INVENTION

It has surprisingly been found that the objects specified here are achieved when the main constituents of the blend composition and an additive are selected in a particular fashion.

It has surprisingly been found that the desired properties are exhibited by a molding compound containing A) at least one polymer selected from the group consisting of polycarbonate and polyestercarbonate, B) a polymer containing
  B1) at least one rubber-modified vinyl (co)polymer containing
    B1.1) 80% to 95% by weight, based on B.1, of at least one vinyl monomer and
    B1.2) 5% to 20% by weight, based on B1, of one or more elastomeric polybutadiene-containing graft substrates,
    wherein B1
      contains polybutadiene-containing rubber particles grafted with the vinyl monomers B1.1 which contain inclusions of vinyl (co)polymer consisting of the vinyl monomers B1.1 and
      a vinyl (co)polymer matrix consisting of the vinyl monomers B1.1 which is not bonded to these rubber particles and not included in rubber particles, and
    optionally B2 further rubber particles grafted with vinyl monomers composed of
      B2.1) 5% to 75% by weight, based on B.2, of at least one vinyl monomer and
      B2.2) 25% to 95% by weight, based on B2, of one or more elastomeric graft substrates,
    wherein the weight ratio of component B1) to B2) is at least 5:1,
C) a masterbatch solid at room temperature containing
  C1) one or more copolymers containing structural units derived from an olefin and structural units derived from a polar comonomer,
  C2) a vulcanized silicone elastomer.

The molding compound contains
preferably 50-80% by weight, more preferably 55% to 70% by weight, of component A
preferably 10-40% by weight, more preferably 15% to 35% by weight, of component B,
preferably 1-10% by weight, more preferably 2% to 8% by weight, of component C
and optionally 0.1% to 20% by weight, preferably 0.2% to 15% by weight, of polymer additives as component D.

In a preferred embodiment the molding compound consists to an extent of at least 90% by weight, more preferably to an extent of at least 95% by weight and most preferably to an extent of 100% by weight of the components A, B, C and D.

In a preferred embodiment the polybutadiene content of the molding compound is 2% to 7% by weight.

Component A

Aromatic polycarbonates and/or aromatic polyestercarbonates of component A which are suitable in accordance with the invention are known from the literature or producible by processes known from the literature (for production of aromatic polycarbonates see, for example, Schnell, "Chemistry and Physics of Polycarbonates", Interscience Publishers, 1964, and also DE-AS 1 495 626, DE-A 2 232 877, DE-A 2 703 376, DE-A 2 714 544, DE-A 3 000 610, DE-A 3 832 396; for production of aromatic polyestercarbonates, for example DE-A 3 007 934).

Aromatic polycarbonates are produced for example by reaction of diphenols with carbonyl halides, preferably phosgene and/or with aromatic dicarbonyl dihalides, preferably dihalides of benzenedicarboxylic acid, by the interfacial process, optionally using chain terminators, for example monophenols, and optionally using trifunctional or more than trifunctional branching agents, for example triphenols or tetraphenols. Production via a melt polymerization process by reaction of diphenols with for example diphenyl carbonate is likewise possible.

Diphenols for the production of the aromatic polycarbonates and/or aromatic polyestercarbonates are preferably those of formula (I)

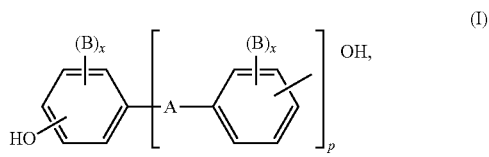

wherein
A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, onto which further aromatic rings optionally containing heteroatoms may be fused,
or a radical of formula (II) or (III)

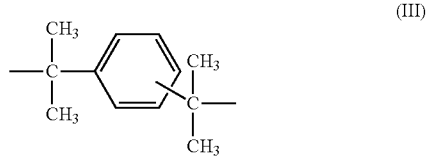

B is in each case $C_1$ to $C_{12}$-alkyl, preferably methyl, halogen, preferably chlorine and/or bromine,
x is independently at each occurrence 0, 1 or 2
p is 1 or 0, and
$R^5$ and $R^6$ are individually choosable for each $X^1$ and are independently of one another hydrogen or $C_1$ to $C_6$-alkyl, preferably hydrogen, methyl or ethyl,
X1 is carbon and
m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes and also ring-brominated and/or ring-chlorinated derivatives thereof.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxybiphenyl sulfide, 4,4'-dihydroxybiphenyl sulfone, and also the di- and tetrabrominated or chlorinated derivatives of these, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is especially preferred.

The diphenols may be used individually or in the form of any desired mixtures. The diphenols are known from the literature or obtainable by literature processes.

Examples of chain terminators suitable for the production of the thermoplastic aromatic polycarbonates include phenol, p-chlorophenol, p-tert-butylphenol or 2,4,6-tribromophenol, and also long-chain alkylphenols such as 4-[2-(2,4,4-trimethylpentyl)]phenol, 4-(1,3-tetramethylbutyl)phenol according to DE-A 2 842 005 and monoalkylphenol or dialkylphenols having a total of from 8 to 20 carbon atoms in the alkyl substituents, for example 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally between 0.5 mol % and 10 mol % based on the molar sum of the diphenols used in each case.

The thermoplastic aromatic polycarbonates have average molecular weights (weight-average $M_w$, measured by GPC (gel permeation chromatography) using a polycarbonate standard based on bisphenol A) of preferably 20 000 to 40 000 g/mol, more preferably 22 000 to 32 000 g/mol, particularly preferably 24 000 to 30 000 g/mol. The preferred ranges result in a particularly advantageous balance of mechanical and rheological properties in the compositions of the invention.

The thermoplastic aromatic polycarbonates may be branched in a known manner, and preferably through incorporation of 0.05 to 2.0 mol % based on the sum of the diphenols used of trifunctional or more than trifunctional compounds, for example those having three or more phenolic groups. Preference is given to using linear polycarbonates, more preferably based on bisphenol A.

Both homopolycarbonates and copolycarbonates are suitable. Copolymers of the invention as per component A can also be produced using 1% to 25% by weight, preferably 2.5% to 25% by weight, based on the total amount of diphenols to be used, of polydiorganosiloxanes having hydroxyaryloxy end groups. These are known (U.S. Pat. No. 3,419,634) and may be produced by processes known from the literature. Likewise suitable are polydiorganosiloxane-containing copolycarbonates; the production of the polydiorganosiloxane-containing copolycarbonates is described in, for example, DE-A 3 334 782.

Aromatic dicarbonyl dihalides for production of aromatic polyester carbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and of terephthalic acid in a ratio between 1:20 and 20:1.

Production of polyester carbonates additionally makes concomitant use of a carbonyl halide, preferably phosgene, as the bifunctional acid derivative.

Chain terminators contemplated for the production of the aromatic polyester carbonates are not only the abovementioned monophenols but also the chlorocarbonic esters of these, and also the acyl chlorides of aromatic monocarboxylic acids, which can optionally have substitution by $C_1$ to $C_{22}$-alkyl groups or by halogen atoms; aliphatic $C_2$ to $C_{22}$-monocarbonyl chlorides can also be used as chain terminators here.

The amount of chain terminators is in each case 0.1 to 10 mol %, based on moles of diphenol in the case of phenolic chain terminators and on moles of dicarboxylic acid dichloride in the case of monocarboxylic acid chloride chain terminators.

One or more aromatic hydroxycarboxylic acids may also be used in the production of aromatic polyestercarbonates.

The aromatic polyestercarbonates may be either linear or branched in a known manner (see DE-A 2 940 024 and DE-A 3 007 934), preference being given to linear polyestercarbonates.

Branching agents used may, for example, be tri- or multifunctional carbonyl chlorides, such as trimesyl trichloride, cyanuric trichloride, 3,3',4,4'-benzophenonetetracarbonyl tetrachloride, 1,4,5,8-naphthalenetetracarbonyl tetrachloride or pyromellitic tetrachloride, in amounts of 0.01 to 1.0 mol % (based on dicarbonyl dichlorides used), or tri- or multifunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of 0.01 to 1.0 mol %, based on diphenols used. Phenolic branching agents may be initially charged together with the diphenols; acid chloride branching agents may be introduced together with the acid dichlorides.

The proportion of carbonate structural units in the thermoplastic aromatic polyestercarbonates may be varied as desired. The proportion of carbonate groups is preferably up to 100 mol %, in particular up to 80 mol %, particularly preferably up to 50 mol %, based on the sum of ester groups and carbonate groups. Both the ester fraction and the carbonate fraction of the aromatic polyestercarbonates may be present in the form of blocks or in random distribution in the polycondensate.

The thermoplastic aromatic polycarbonates and polyestercarbonates may be used alone or in any desired mixture.

Preference is given to using polycarbonate based on bisphenol A as component A.

Component B

The rubber-modified vinyl (co)polymers employable as component B contain the components B1 and optionally B2. The weight ratio of components B1 to B2 is at least 5:1, preferably at least 10:1, more preferably from 10:1 to 30:1.

B1

Component B1 is a first rubber-modified vinyl (co)polymer, preferably produced in a bulk polymerization process,
containing a disperse phase composed of polybutadiene-containing rubber particles grafted with vinyl monomers B1.1 and having inclusions of vinyl (co)polymer consisting of the vinyl monomers B1.1, and a rubber-free vinyl (co)polymer matrix consisting of the vinyl monomers B1.1 which is not bound to the rubber particles and not included in the rubber particles,
wherein the rubber particles containing vinyl (co)polymer inclusions preferably have a median particle diameter D50 measured by ultracentrifugation of 0.3 to 10.00 µm, more preferably 0.5 to 1.5 µm, in particular of 0.7 to 1.0 µm,
which has a polybutadiene content of preferably 5% to 20% by weight, more preferably of 7% to 15% by weight, in particular of 8% to 13% by weight.

Component B1 may also be selected from mixtures of rubber-modified vinyl (co)polymers which in each case meet the abovementioned conditions.

The rubber-modified vinyl (co)polymers of component B1 have a melt flow rate (MFR) measured according to ISO 1133 (2012 version) at 220° C. with an applied load of 10 kg of preferably 2 to 15 g/10 min, particularly preferably 3 to 10 g/10 min, especially 4 to 8 g/10 min.

Rubber-modified vinyl (co)polymers B1 of this kind are produced by polymerization of B1.1) preferably 80% to 95% by weight, particularly preferably 83% to 93% by weight, more preferably 85% to 92% by weight, based on the rubber-modified vinyl (co)polymer B1, of at least one vinyl monomer in the presence of B1.2) preferably 5% to 20% by weight, particularly preferably 7% to 17% by weight, more preferably 8% to 15% by weight, based on the rubber-modified vinyl (co)polymer B1, of one or more elastomeric polybutadiene-containing graft substrates having glass transition temperatures <−50° C., more preferably of <−60° C., particularly preferably <−70° C.

Unless expressly stated otherwise in the present invention the glass transition temperature is determined for all components by differential scanning calorimetry (DSC) according to DIN EN 61006 (1994 version) at a heating rate of 10 K/min with determination of Tg as the midpoint temperature (tangent method).

The bulk polymerization reaction preferably employed for production of the rubber-modified vinyl (co)polymer B1 comprises both the polymerization of the vinyl monomers according to B1.1 and grafting of the vinyl (co)polymer thus formed onto the elastomeric graft substrate according to B1.2. Additionally formed in this reaction regime, as a result of self-organization (phase separation), is a rubber-containing phase likewise containing phase-separated inclusions and composed of vinyl (co)polymer consisting of the monomers according to B1.1, this rubber-containing phase being in dispersed form in a vinyl (co)polymer matrix formed from the monomers according to B1.1. Inclusions are understood to mean that vinyl (co)polymer is embedded within the rubber particles. The vinyl (co)polymer may be chemically bonded to the elastomeric graft substrate or be included in the form of unattached polymer chains. The included vinyl (co)polymer cannot be leached out by means of standard solvents such as acetone.

The size of the rubber particles in the rubber-modified vinyl (co)polymers B1 thus produced is adjusted via the conditions of the reaction regime, such as the temperature and resulting viscosity of the polymer and shear as a result of stirring, for example.

The median particle size D50 is the diameter with 50% by weight of the particles above it and 50% by weight below it. Unless expressly stated otherwise in the present invention it is determined for all components by means of ultracentrifuge measurement (W. Scholtan, H. Lange, Kolloid, Z. und Z. Polymere [Polymers] 250 (1972), 782-1796).

The monomers B1.1 are preferably mixtures of

B1.1.1) 65 to 85 parts by weight, particularly preferably 70 to 80 parts by weight, more preferably 74 to 78 parts by weight, in each case based on the sum of B1.1.1 and B1.1.2, of vinylaromatics and/or ring-substituted vinylaromatics (such as styrene, α-methylstyrene, p-methylstyrene, p-chlorostyrene) and/or (C1-C8)-alkyl (meth)acrylates, such as methyl methacrylate, ethyl methacrylate, and B1.1.2) 15 to 35 parts by weight, particularly preferably 20 to 30 parts by weight, more preferably 22 to 26 parts by weight, in each case based on the sum of B1.1.1 and B1.1.2, of vinyl cyanides (unsaturated nitriles such as acrylonitrile and methacrylonitrile) and/or (C1-C8)-alkyl (meth)acrylates, such as methyl methacrylate, n-butyl acrylate, t-butyl acrylate, and/or derivates (such as anhydrides and imides) of unsaturated carboxylic acids, for example maleic anhydride.

Preferred monomers B1.1.1 are selected from at least one of the monomers styrene, α-methylstyrene and methyl methacrylate. Preferred monomers B1.1.2 are selected from at least one of the monomers acrylonitrile, butyl acrylate, maleic anhydride and methyl methacrylate. Particularly preferred monomers are B1.1.1 styrene and B1.1.2 acrylonitrile.

In a further preferred embodiment B1.1.1 is styrene and B1.1.2 is a mixture of acrylonitrile and butyl acrylate.

In this embodiment it is preferable to employ

65% to 80% by weight, preferably 67% to 75% by weight, based on component B1.1, of styrene, 15 to 30% by weight, preferably 20% to 28% by weight, based on component B1.1, of acrylonitrile and 2% to 8% by weight, preferably 3% to 6% by weight, based on component B1.1, of butyl acrylate.

eingesetzt.

As described above, component B1 may also be a mixture of two or more rubber-modified vinyl (co)polymers. In a preferred embodiment mixtures of two rubber-modified vinyl (co)polymers are employed. It is further preferable when in the first of these rubber-modified vinyl (co)polymers styrene is used as B.1.1.1 and acrylonitrile is used as B1.1.2 while in the second rubber-modified vinyl (co)polymer styrene is used as B.1.1.1 and a mixture of acrylonitrile and butyl acrylate is used as B1.1.2.

The weight ratio of the first rubber-modified vinyl (co)polymer to the second rubber-modified vinyl (co)polymer is preferably 1:1 to 10:1, more preferably 2:1 to 8:1.

Preferred graft substrates B1.2 are diene rubbers containing butadiene or mixtures of diene rubbers containing butadiene or copolymers of diene rubbers containing butadiene or mixtures thereof with further copolymerizable monomers (for example of B1.1.1 and B1.1.2).

A particularly preferred graft substrate B1.2 is pure polybutadiene rubber. In a further preferred embodiment B1.2 is styrene-butadiene block copolymer rubber.

B2

The rubber-modified vinyl (co)polymers according to component B may optionally contain further rubber particles (graft polymers) B2 grafted with vinyl monomers having an elastomeric core and a vinyl (co)polymer shell, preferably produced in emulsion polymerization processes.

Graft polymers having an elastomeric core and a vinyl (co)polymer shell that are usable in accordance with the invention in such a way as a constituent of component B2 are one or more graft polymers produced by grafting B2.1) 5 to 75% by weight, preferably 10 to 60% by weight, particularly preferably 25 to 50% by weight, based on the graft polymer B2, of at least one vinyl monomer onto B2.2 25% to 95% by weight, preferably 40% to 90% by weight, particularly preferably from 50% to 75% by weight, based on the graft polymer B2, of one or more elastomeric graft substrates.

The graft substrates B2.2 preferably have glass transition temperatures of <−30° C., more preferably of <−50° C., particularly preferably <−70° C.

The graft substrate B2.2 of the graft polymers B2 generally has a median particle size (D50) of 0.05 to 1.00 μm, preferably 0.10 to 0.7 μm, more preferably 0.15 to 0.5 μm, and particularly preferably of 0.2 to 0.4 μm.

The monomers B2.1 used for the graft polymers B2 are preferably mixtures of

B2.1.1) 50 to 90 parts by weight, particularly preferably 70 to 80 parts by weight, in each case based on the sum of B2.1.1 and B2.1.2, of vinylaromatics and/or ring-substituted vinylaromatics (such as styrene, α-methylstyrene, p-methylstyrene, p-chlorostyrene) and/or (C1-C8)-alkyl (meth)acrylates, such as methyl methacrylate, ethyl methacrylate, and B2.1.2) 10 to 50 parts by weight, particularly preferably 20 to 30 parts by weight, in each case based on the sum of B2.1.1 and B2.1.2, of vinyl cyanides (unsaturated nitriles such as acrylonitrile and methacrylonitrile) and/or (C1-C8)-alkyl (meth)acrylates, such as methyl methacrylate, n-butyl acrylate, t-butyl acrylate and/or derivatives (such as anhydrides and imides) of unsaturated carboxylic acids, for example maleic anhydride.

Preferred monomers B2.1.1 for the graft polymers B2 are selected from at least one of the monomers styrene, α-methylstyrene and methyl methacrylate; preferred monomers B2.1.2 are selected from at least one of the monomers acrylonitrile, maleic anhydride and methyl methacrylate. Particularly preferred monomers are B2.1.1 styrene and B2.1.2 acrylonitrile or B2.1.1 styrene and B2.1.2 methyl methacrylate or B2.1.1=B2.1.2 methyl methacrylate.

Suitable graft substrates B2.2 of the graft polymers B2 include for example diene rubbers, EP(D)M rubbers, i.e. those based on ethylene/propylene and optionally dienes, and acrylate, polyurethane, silicone, chloroprene, ethylene/vinyl acetate and also acrylate-silicone composite rubbers.

Preferred graft substrates B2.2 are diene rubbers, preferably containing butadiene or copolymers of dienes, preferably containing butadiene, and further copolymerizable vinyl monomers (e.g. according to B2.1.1 and B2.1.2) or mixtures of one or more of the aforementioned components.

A particularly preferred graft substrate B2.2 for the graft polymers B2 is pure polybutadiene rubber. In a further preferred embodiment B2.2 is styrene-butadiene rubber, particularly preferably styrene-butadiene block copolymer rubber.

Particularly suitable graft polymers B2 are, for example, ABS polymers, in a preferred embodiment those produced in an emulsion polymerization process by redox initiation with an initiator system composed of organic hydroperoxide and ascorbic acid according to U.S. Pat. No. 4,937,285.

Particularly preferred rubber-modified vinyl (co)polymers according to component B are for example ABS polymers (emulsion, bulk and suspension ABS) as described for example in DE-A 2 035 390 (=U.S. Pat. No. 3,644,574) or in DE-A 2 248 242 (=GB 1 409 275) or in Ullmanns Enzyklopädie der Technischen Chemie, vol. 19 (1980), p. 280 ff.

The rubber-modified vinyl (co)polymers according to component B contain free vinyl (co)polymer, i.e. vinyl (co)polymer not chemically bonded to the graft substrate(s) B1.2 or B2.2 and not included in the rubber particles, consisting of the monomers according to B1.1 or B2.1. This may be formed as a consequence of production in the polymerization of the graft polymers B1 or B2, or may be polymerized separately and admixed with component B. It is likewise possible for a portion of the free vinyl (co)polymer in the rubber-modified vinyl (co)polymer according to component B to originate as a consequence of production from the polymers B1 or B2 themselves and for another portion to be polymerized separately and added to component B. The proportion of free vinyl (co)polymer (irrespective of origin), measured as the acetone-soluble fraction, in component B is preferably at least 20% by weight, particularly preferably at least 30% by weight, based on component B.

In the rubber-modified vinyl (co)polymers according to component B this free vinyl (co)polymer has a weight-average molecular weight Mw of 70 to 250 kg/mol, preferably of 140 to 200 kg/mol, in particular of 150 to 180 kg/mol.

In the context of the present invention, the weight average molecular weight Mw of the free vinyl (co)polymer in component B is measured by gel permeation chromatography (GPC) in tetrahydrofuran against a polystyrene standard.

Component C

Component C is a masterbatch containing a stick-slip modifier containing

C1) one or more thermoplastic organic materials
C2) a vulcanized silicone elastomer A masterbatch is an additive for polymers to endow these with certain properties. An additive as the actual active ingredient is encapsulated at high concentration in a carrier resin at elevated temperature. Cooling of the carrier resin is typically followed by pelletization to obtain and easily meterable form. This allows additives which may be liquid and therefore difficult to introduce into a polymer alone to be admixed easily.

In component C, component C1 is this carrier resin. Component C1 is a copolymer containing structural units derived from an olefin and structural units derived from a polar comonomer. Suitable olefins include in particular ethylene and propylene and particularly preferred comonomers are acrylic acid, methacrylic acid and vinyl acetate. It is also possible to employ mixtures of such polyolefin copolymers.

A particularly suitable carrier resin (C1) is Elvaloy™ AC 1609 (Dupont), which is an ethylene acrylate copolymer.

The proportion of component C1 is 40 to 80% by weight based on component C.

A polysiloxane contains a plurality of Si—O—Si bonds which form a polymer chain, wherein the backbone of the polymer chain consists of —(Si—O)— repeating units.

An organopolysiloxane contains repeating (Si—O) units where at least one Si atom carries at least one organic group, i.e. group containing at least one carbon atom.

A silane is a compound derived from Si—$H_4$ and often contains at least one Si—C bond. Unless otherwise stated a silane contains only one Si atom.

A polysiloxane comprises end groups and side groups. An end group is a chemical group attached to a Si atom located at one end of the polymer chain. A side group is a group attached to a Si atom, wherein the Si atom is not located at the end of the chain. An organopolysiloxane typically contains a mixture of the following structures:

(IV)

(M)

(D)

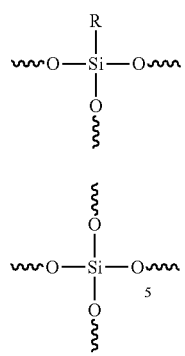

wherein M, D, T and Q independently of one another represent the functionality of structural groups of organopolysiloxane. In particular, M represents a monofunctional group $RsSiO_{1/2}$ represent; D represents a difunctional group $R2SiO_{2/2}$ represent; T represents a trifunctional group $RSiO_{3/2}$; and Q represents a tetrafunctional group $SiO_{4/2}$. Thus for example linear organopolysiloxanes have a backbone of D units and the end groups are M units while branched organopolysiloxanes may have for example a backbone of D units interspersed with T and/or Q units.

A crosslinking reaction is a reaction in which two or more molecules, wherein at least one of the molecules is a polymer, are joined together to cure the polymer.

A crosslinker is a compound capable of bringing about a crosslinking reaction of a polymer. The process of mixing the elastomer and thermoplastic matrix and curing the elastomer using a crosslinker (or catalyst) during the mixing process is known as dynamic vulcanization. The resulting blend consisting of a thermoplastic matrix and a crosslinked (vulcanized) elastomer is referred to as a thermoplastic vulcanizate. When the crosslinked (vulcanized) elastomeric component is a silicone polymer while the thermoplastic component is an organic non-silicone polymer this is referred to as a thermoplastic silicone vulcanizate.

The vulcanized silicone elastomer (C2) may be produced by curing any of the following compositions:

a diorganopolysiloxane having on average at least two alkenyl groups per molecule (C2a1) and either (i) an organopolysiloxane having at least two Si-bonded hydrogen atoms, alternatively at least three Si-bonded hydrogen atoms, per molecule (C2a2) and a hydrosilylation catalyst (C2a3) and optionally a catalyst inhibitor (C2a5) or (ii) a free-radical initiator (C2a4).

Alternatively, the vulcanized silicone elastomer (C2) may be produced by curing a composition comprising a silanol-terminated diorganopolysiloxane (C2b1), organopolysiloxane having at least two Si-bonded hydrogen atoms, alternatively at least three Si-bonded hydrogen atoms, per molecule (C2a2) and a condensation catalyst (C2b3).

The proportion of component C2 is preferably 20% to 60% by weight based on component C.

Diorganopolysiloxane Having on Average at Least Two Alkenyl Groups Per Molecule (C2a1)

The silicon-bonded organic groups of component (C2a1) are independently of one another selected from hydrocarbon or halogenated hydrocarbon groups.

This may be selected for example from alkyl groups having 1 to 20 carbon atoms such as methyl, ethyl, propyl, butyl, pentyl and hexyl; cycloalkyl groups such as cyclohexyl and cycloheptyl; alkenyl groups having 2 to 20 carbon atoms such as vinyl, allyl and hexenyl; aryl groups having 6 to 12 carbon atoms such as phenyl, tolyl and xylyl; aralkyl groups having 7 to 20 carbon atoms such as benzyl and phenethyl and halogenated alkyl groups having 1 to 20 carbon atoms such as 3,3,3-trifluoropropyl and chloromethyl.

These groups are selected such that the diorganopolysiloxane has a glass transition temperature (or melting point) below room temperature, thus causing this component to form an elastomer upon curing.

It is preferable when the at least 85 mol %, more preferably at least 90 mol %, of the silicon-bonded organic groups in component (C2a1) are methyl groups.

Polydiorganosiloxane (C2a1) may accordingly be a homopolymer, a copolymer, or a terpolymer containing such organic groups. Examples include silicone liquids or silicone rubbers comprising dimethylsiloxy units, dimethylsiloxy units and phenylmethylsiloxy units; dimethylsiloxy units and diphenylsiloxy units; and dimethylsiloxy units, diphenylsiloxy units and phenylmethylsiloxy units, among others. Molecular structure is likewise not critical and linear and/or partially branched structures may be concerned, wherein linear dimethylsiloxy units are preferred. Examples include α,ω-vinyldimethylsiloxypolydimethylsiloxane, an α,ω-vinyldimethylsiloxy copolymer of methylvinylsiloxane and dimethylsiloxane units, and/or an α,ω-trimethylsiloxy copolymer of methylvinylsiloxane and dimethylsiloxane units.

The diorganopolysiloxane polymer (C2a1) may have a viscosity of at least 100 000 $mm^2s^{-1}$(cSt) at 25° C. but typically at least 1 000 000 $mm^2 \cdot s^{-1}$ (cSt) at 25° C. measured using an AR 2000 Rheometer from TA Instruments, New Castle, DE, USA or a suitable Brookfield viscometer fitted with the most suitable spindle for the viscosity to be measured. The diorganopolysiloxane polymer (C2a1) may be an uncured silicone rubber characterized by a Williams plasticity value of at least 100 mm/100 measured according to ASTM D-926-08 using a Williams parallel plate plastometer. An alternative to the use of Williams plasticity the rubber may also be evaluated by its shore A hardness according to ASTM D2240-03, wherein the values are typically at least 30. The diorganopolysiloxane polymer (C2a1) may be modified with a small amount of a nonreactive silicone such as a trimethylsilyl-terminated polydimethylsiloxane. In one alternative the diorganopolysiloxane polymer (C2a1) is an unvulcanized silicone rubber.

Organopolysiloxane Having at Least Two Si-Bonded Hydrogen Atoms, Alternatively at Least Three Si-Bonded Hydrogen Atoms, Per Molecule (C2a2)

The organopolysiloxane having at least two Si-bonded hydrogen atoms, alternatively at least three Si-bonded hydrogen atoms, per molecule (C2a2) may be for example an organosilicon resin having a low molecular weight or a short- or long-chain organosiloxane polymer, which may be linear or cyclic. The silicon-bonded organic groups of component (C2a2) are independently of one another selected from any of the hydrocarbon or halogenated hydrocarbon groups described above in connection with diorganopolysiloxane (C2a1 and C2b1) including preferred embodiments thereof. The molecular structure of component (C2a2) is likewise not critical and linear, partially branched, cyclic and network structures are possible, wherein linear polymers or copolymers are preferred, and this component should be effective in the curing of components (C2a1) and (C2b1).

(C2a2) preferably has at least three silicon-bonded hydrogen atoms per molecule that are capable of reacting with the alkenyl or other aliphatically unsaturated groups of the diorganopolysiloxane polymer (C2a1) and the —OH groups of (C2b1). The position of the silicon-bonded hydrogen in component (C2a2) is not critical, i.e. the Si—H groups may be terminal groups or side groups in non-terminal positions along the molecular chain or at both positions. To ensure crosslinking when (C2a2) has only two Si—H bonds at least a portion of the respective polymer (C2a1) or (C2b1) must have at least three groups capable of reacting with (C2a2) molecules. The organopolysiloxane having at least two Si-bonded hydrogen atoms, alternatively at least three Si-bonded hydrogen atoms, per molecule (C2a2), may have for example the general formula:

$$R^3R^4{}_2SiO\ (R^4{}_2SiO)_p(R^4HSiO)_qSiR^4{}_2R^3 \quad \text{or} \qquad (V)$$

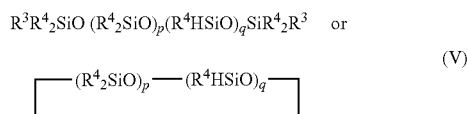

wherein $R^4$ presents an alkyl or aryl group having up to 10 carbon atoms and $R^3$ represents a group $R^4$ or a hydrogen atom, p has a value of 0 to 20 and q has a value of 1 to 70 and wherein at least 2 or 3 silicon-bonded hydrogen atoms are present per molecule. $R^4$ may be for example a lower alkyl group having 1 to 3 carbon atoms, for example a methyl group. The organopolysiloxane having at least two Si-bonded hydrogen atoms, alternatively at least three Si-bonded hydrogen atoms, per molecule (C2a2) may have a viscosity of 0.5 to 1000 $mm^2 \cdot s^{-1}$ (cSt), preferably 2 to 100 $mm^2 \cdot s^{-1}$ (cSt) more preferably 5 to 60 $mm^2 \cdot s^{-1}$ (cSt), at 25° C. for example, typically measured with a Brookfield viscometer fitted with the most suitable spindle for the viscosity to be measured. The average degree of polymerization of (C2a2) may for example be in the range from 30 to 400 siloxane units per molecule.

Component (C2a2) may be elucidated by the following siloxanes which typically have a viscosity of 0.5 to 1000 $mm^2 s^{-1}$ (cSt) at 25° C.:

low molecular weight siloxanes, such as PhSi(OSiMe2H)$_3$;

trimethylsiloxy-endblocked methylhydridopolysiloxanes;

trimethylsiloxy-endblocked dimethylsiloxane-methylhydridosiloxane copolymers;

dimethylhydridosiloxy-endblocked dimethylpolysiloxanes;

dimethylhydrosiloxy-endblocked methylhydropolysiloxanes;

dimethylhydridosiloxy-endblocked dimethylsiloxane-methylhydridosiloxane copolymers;

cyclic methylhydropolysiloxanes;

cyclic dimethylsiloxane-methylhydridosiloxane copolymers;

tetrakis(dimethylhydrosiloxy)silane;

silicone resins consisting of (CH3)$_2$HSiOi/2, (C$_{3/4}$)3SiOi/2 and Si04/2 units; and silicone resins consisting of (C3/4)2HSiOi/2, (CH3)3 SiOi/2, CH3Si03/2, PhSi03/2 and Si04/2 units.

(C2a2) may comprise a mixture of more than one of these materials.

The molar ratio of Si—H groups in (C2a2) to aliphatically unsaturated groups in the diorganopolysiloxane polymer (C2a1) is preferably at least 1:1 and may be up to 8:1 or 10:1. The molar ratio of Si—H groups to aliphatically unsaturated groups is preferably in the range from 1.5:1 to 5:1.

(C2a2) is used in an amount such that the molar ratio of Si—H therein to Si—OH in component (C2b1) is about 0.5 to 10, preferably 1 to 5 and most preferably about 1.5.

These Si—H functional materials are well known in the art and many are commercially available.

Hydrosilylation Catalyst (C2a3)

The hydrosilylation catalyst (C2a3) is preferably a platinum group metal (platinum, ruthenium, osmium, rhodium, iridium and palladium) or a compound thereof.

Preferred catalysts include platinum and/or platinum compounds, for example finely powdered platinum; a chloroplatinic acid or an alcohol solution of a chloroplatinic acid; an olefin complex of a chloroplatinic acid; a complex of a chloroplatinic acid and an alkenylsiloxane; a platinum-diketone complex; metallic platinum on silicon dioxide, aluminum dioxide, carbon or a similar support; or a thermoplastic resin powder containing a platinum compound.

The catalyst (C2a3) is preferably used in an amount of 0.5 to 100 ppm (by weight) of platinum group metal based on the polyorganosiloxane composition (C), more preferably 1 to 50 ppm. The hydrosilylation catalyst (C2a3) catalyzes the reaction of the alkenyl groups of the diorganopolysiloxane polymer (C2a1) with the Si—H groups of (C2a2).

Inhibitor (C2a5)

If a hydrosilylation catalyst is used for curing the diorganopolysiloxane polymer (C2a1) the composition may optionally contain an inhibitor (C2a5) to retard the curing process. The term "inhibitor" is herein to be understood as meaning a material which retards the curing of component component (C2a1) when incorporated in small amounts, such as for example less than 10 percent by weight based on the siloxane composition of (C2a1), without affecting the overall curing of the mixture.

Inhibitors of platinum group-based catalysts (C2a5), in particular platinum-based catalysts (C2a5), are known. These include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, nitriles and diaziridines.

The inhibitor (C2a5) is preferably selected from the group consisting of 1-ethynyl-1-cyclohexanol, 2-methyl-3-butyn-2-ol, 3-butyn-1-ol, 3-butyn-2-ol, propargyl alcohol, 2-phenyl-2-propyn-1-ol, 3,5-dimethyl-1-hexyn-3-ol, 1-ethynylcyclopentanol, 1-phenyl-2-propynol and mixtures thereof.

The inhibitor (C2a5) may be added in an amount in the range from 0% to 10% by weight based on component (C2), preferably 0.05% to 5% by weight of component (C2), but is generally used in an amount sufficient to retard the curing of the diorganopolysiloxane (C2a1). This amount may be optimized for a particular system by routine experimentation.

Radical Initiator (C2a4)

The radical initiator (C2a4) is a compound that decomposes at elevated temperature to form free-radical species. The latter promote the crosslinking reaction between the alkenyl groups of diorganopolysiloxanes (C2a1) during the dynamic vulcanization step of the present process. This component is selected for example from azo compounds, carbon compounds and organic peroxy compounds such as hydroperoxides, diacyl peroxides, ketone peroxides, peroxy esters, dialkyl peroxides, diaryl peroxides, arylalkyl peroxides, peroxydicarbonates, peroxyketals, peroxyacids, acylalkyls and alkyl monoperoxydicarbonates.

For the purposes of the present invention the radical initiator (C2a4) is selected such that the difference between the 6 minute half-life of the initiator and the process temperature is between −60° C. and 20° C. The following condition is met: −60° C.≤{T(6)−T(0)}≤=20° C., wherein T(6) represents the temperature (° C.) at which the initiator has a half-life of 6 minutes and T(0) represents the processing temperature (° C.) before initiator addition (i.e. the actual temperature of the mixture of components (C1) to (C2)). The value of T(6) is available from the manufacturer of the initiator or may be determined by methods known in the art. After introduction of the initiator the temperature generally rises slightly as dynamic vulcanization occurs unless intentional cooling is carried out. However, such cooling is generally unnecessary unless the temperature rises dramatically (for example more than about 30° C.).

Examples of suitable radical initiators include 2,2'-azobisisobutyronitrile, 2,2'-azobis(2-methylbutyronitrile), dibenzoyl peroxide, tert-amyl peroxyacetate, 1,4-di(2-tert-butylperoxyisopropyl)benzene, tert-butylcumyl peroxide, 2,4,4-trimethylpentyl-2-hydroperoxide, diisopropylbenzene monohydroperoxide, cumyl hydroperoxide, tert-butyl hydroperoxide, tert-amyl hydroperoxide, 1,1-di(tert-butylperoxy)cyclohexane, tert-butylperoxycyclohexane, tert-butylperoxyperoxybenzoate, dicumyl peroxide, 2,5-dimethyl-2,5-di-tert-butylperoxyhexanebis(1-methyl-1-phenylethyl)peroxide, 2,5-dimethyl-2,5-di-(tert-butylperoxy)-3-hexyne, di-tert-butyl peroxide, α,α-dimethylbenzylhydroperoxide and 3,4-dimethyl-3,4-diphenylhexane.

The initiator (C2a4) is used in an amount sufficient to cure the diorganopolysiloxane (C2a1) and this amount is optimized for a particular system by routine experimentation.

An insufficient amount results in insufficient crosslinking and poor mechanical properties. On the other hand, addition of excess initiator results in uneconomic and undesired side reactions such as polymer degradation. The initiator (C2a4) is preferably added in an amount of 0.05 to 6 parts by weight, alternatively 0.2 to 3 parts by weight, per 100 parts by weight of diorganopolysiloxane (C2a1).

Diorganopolysiloxane (C2b1)

The diorganopolysiloxane (C2b1) is a silicone liquid or a silicon rubber in each case terminated with silanol (i.e. —SiOH) group and has a viscosity of at least 100 000 $mm^2s^{-1}$(cSt) at 25° C., preferably at least 1 000 000 $mm^2s^{-1}$(cSt) at 25° C. The silicon-bonded organic groups of component (C2b1) are independently of one another selected from hydrocarbon or halogenated hydrocarbon groups as defined hereinabove for (C2a1). Again, methyl preferably accounts for at least 85 mol %, more preferably at least 90 mol %, of the silicon-bonded organic groups in component (C2b1).

Polydiorganosiloxane (C2b1) may accordingly be a homopolymer, a copolymer, or a terpolymer containing such organic groups. Examples include silicone liquids or silicone rubbers comprising dimethylsiloxy units and phenylmethylsiloxy units; dimethylsiloxy units and diphenylsiloxy units; and dimethylsiloxy units, diphenylsiloxy units and phenylmethylsiloxy units, among others. Molecular structure is likewise not critical and may comprise linear or partially branched structures, wherein linear structures are preferred.

Specific examples of organopolysiloxane (C2b1) include: dimethylhydroxysiloxy-endblocked dimethylsiloxane homopolymers;
dimethylhydroxysiloxy-endblocked methylphenylsiloxane-dimethylsiloxane copolymers and dimethylhydroxysiloxy-endblocked methylphenylpolysiloxanes. Preferred systems for low temperature applications include silanol-functional methylphenylsiloxanedimethylsiloxane copolymers and diphenylsiloxane-dimethylsiloxane copolymers, wherein the preferred mole content of dimethylsiloxane units is about 93%.

Component (C2b1) may also consist of combinations of two or more organopolysiloxane liquids or rubbers. Component (C2b1) is most preferably a polydimethylsiloxane homopolymer terminated with a silanol group at each end of the molecule.

The molecular weight of the diorganopolysiloxane is preferably sufficient to impart a Williams plasticity number of at least about 30 as determined by ASTM D-926-08. The plasticity number, as used herein, is defined as the thickness in millimeters×100 of a cylindrical test specimen having a volume of 2 $cm^3$ and a height of approximately 10 mm after subjecting the specimen to a compressive load of 49 Newtons at 25° C. for three minutes. Although there is no absolute upper limit for the plasticity of (C2b1), processability in conventional mixing equipment generally limits this value. The plasticity number should preferably be about 100 to 200, most preferably about 120 to 185. Such uncrosslinked silicone rubbers may easily be dispersed in the one or more thermoplastic organic materials (C1) without the need for a filler (C2c).

However, it has been found that liquid diorganopolysiloxanes having a viscosity of about 10 to 100 Pa·s at 25° C. often cannot be readily dispersed in further thermoplastic resin. In these circumstances the liquid must be mixed with up to about 300 parts by weight of filler (C2c), as described below, per 100 parts by weight (C2b1) to facilitate dispersion. The liquid and the filler are preferably mixed before adding to this combination to additional thermoplastic resin, though they may also be added separately.

Condensation Catalyst (C2b3)

The condensation catalyst (C2b3) of the present invention is any desired compound that promotes the condensation reaction between the Si—OH groups of diorganopolysiloxane (C2b1) and the Si—H groups of the organopolysiloxane having at least two Si-bonded hydrogen atoms, preferably at least three Si-bonded hydrogen atoms, per molecule (C2a2) to cure the diorganopolysiloxane by forming —Si—O—Si— bonds. However, the catalyst (C2b3) cannot be a platinum compound or a complex since the use of such a condensation catalyst often results in poor processing and poor physical properties of the resulting thermoplastic silicone vulcanizate.

The condensation catalyst (C2b3) is present in an amount sufficient to cure the diorganopolysiloxane (C2b1) and the organopolysiloxane having at least two, preferably at least three, Si-bonded hydrogen atoms (C2a2) as defined above.

Examples of suitable catalysts include metal carboxylates such as dibutyltin diacetate, dibutyltin dilaurate, tin tripropyl acetate, tin octoate, tin oxalate, tin naphthanate; amines such as triethylamine, ethylene triamine; and quaternary ammonium compounds such as benzylttrimethylammonium hydroxide, beta-hydroxyethyltrimethylammonium 2-ethylhexanoate and beta-hydroxyethylbenzyltrimethyldimethylammonium butoxide (see for example U.S. Pat. No. 3,024,210).

Optional Reinforcing Filler (C2c)

The composition used to produce the vulcanized silicone elastomer may contain a reinforcing filler (C2c). The reinforcing filler (C2c) may be silicon dioxide for example. The silicon dioxide may be, for example, pyrogenic silicon dioxide, for example that marketed by Cabot under the trade name Cab-O-Sil MS-75D, or may be precipitated silicon dioxide. The particle size of the silica is for example in the range from 0.5 µm to 20 µm, preferably from 1 to 10 µm. The silicon dioxide may be a surface-treated silicon dioxide. The surface treatment can be carried out for example with a silane or with a polysiloxane. The silane or polysiloxane used for treatment of the silicon dioxide typically contains hydrophilic groups which bond to the silicon dioxide surface and aliphatically unsaturated hydrocarbon or hydrocarbonoxy groups and/or Si-bonded hydrogen atoms.

For example, the silicon dioxide may be treated with 2% to 60% by weight, based on the silica, of an alkoxysilane containing alkenyl groups or an oligomeric organopolysiloxane containing alkenyl groups.

The process for producing the masterbatch (C) comprises the steps of:

(i) mixing components used to produce the vulcanized silicone elastomer (C2) to form a silicone composition, (ii) mixing the silicone composition with component (C1), (iii) vulcanizing the silicone composition to form the vulcanized silicone elastomer (C2).

The masterbatch may also be produced by the following procedure, wherein the sequence of the steps may also be varied:

1. The one or more thermoplastic organic materials (C1) are first softened or melted as required at a suitable temperature.

2. The components of (C2) involved in the dynamic vulcanization of the diorganopolysiloxane (C2a1) or (C2b1) to form the proportion of the vulcanized silicone elastomer portion in the masterbatch composition are then incorporated into the one or more thermoplastic organic materials (C1) at elevated temperature.

Several alternatives may be used for the processes described above.

The performance of the recited step is carried out in such a way as to allow heating and commixing of the constituents. Component (C1) must be softened. Temperatures between 185° C. and 310° C. are suitable therefor.

The mixing can be achieved, for example, by compounding using a single-axis extruder, a dual-axis extruder or a multi-axis extruder. Alternatively, mixing can be performed using for example an internal batch mixer such as a Z-blade mixer or a Banbury mixer, wherein sufficient mixing time must be ensured to achieve a uniform distribution of the components.

The masterbatch may then be pelletized.

The vulcanized silicone elastomer (C2) is produced by dynamic curing of one of the following curing compositions which optionally also contains component (C2c):

1) a diorganopolysiloxane (C2a1) having on average at least two alkenyl groups per molecule and an organopolysiloxane having at least two Si-bonded hydrogen atoms, preferably at least three Si-bonded hydrogen atoms, per molecule (C2a2) and a hydrosilylation catalyst (C2a3) and optionally a catalyst inhibitor (C2a5);

2) a diorganopolysiloxane (C2a1) having on average at least two alkenyl groups per molecule and a radical initiator (C2a4) and optionally organopolysiloxane having at least two Si-bonded hydrogen atoms, preferably at least three Si-bonded hydrogen atoms, per molecule (C2a2); or 3) a silanol-terminated diorganopolysiloxane (C2b1), an organopolysiloxane having at least two Si-bonded hydrogen atoms (C2a2) and a condensation catalyst (C2b3).

The diorganopolysiloxane (C2a1) or (C2b1) is metered in and distributed into the softened or melted matrix of the one or more thermoplastic organic materials (C1) with input of mechanical mixing energy.

The ingredients of the alternative curing packages are then metered into the mixture separately (no preferred order) or in combination to initiate and complete vulcanization of the respective polyorganosiloxane.

A hydrosilylation reaction inhibitor (addition curing reaction inhibitor) (C2a5) may be added to the mixture to increase the residence time before completion of the vulcanization reaction in a hydrosilylation (addition) curing process.

If used, the inhibitor (C2a5) is metered into the composition either before the catalyst and/or before the crosslinker.

The optional additives (C2c) may be introduced as required simultaneously or separately and during or after completion of the dynamic curing process.

Instead of introducing each constituent individually as described above it is alternatively possible to introduce predispersed organopolysiloxane compositions into the one or more thermoplastic organic materials (C1) at elevated temperature.

In a further alternative the components of the composition used for producing the vulcanized silicone elastomers may be premixed and cured, so that the ready-vulcanized silicone elastomer is incorporated into the one or more thermoplastic organic materials (C1).

An example of suitable melt mixing equipment is a twin-screw extruder.

Suitable masterbatches and the production thereof are disclosed in WO 2019/195516 A1. A suitable commercially available product is Dow Corning™ HMB-1903 Masterbatch (Dow Chemical).

Component D

As component D the molding compound according to the invention may contain one or more polymer additives preferably selected from the group consisting of anti-drip agents, flame retardant synergists, smoke inhibitors, lubricants and demolding agents, nucleating agents, antistats, conductivity additives, stabilizers (e.g. hydrolysis, heat aging and UV stabilizers and also transesterification inhibitors), flow promoters, phase compatibilizers, further polymeric constituents other than components A, B and C (for example functional blend partners), fillers and reinforcers, and dyes and pigments.

In a preferred embodiment the molding compound contains at least one polymer additive selected from the group consisting of lubricants and demolding agents, stabilizers, anti-drip agents, flow promoters, phase compatibilizers, further polymeric constituents, dyes and pigments.

In a preferred embodiment the molding compound contains as a stabilizer at least one representative selected from the group consisting of sterically hindered phenols, phosphoric acids, organic phosphites and sulfur-based co-stabilizers.

Production of the Molding Compounds and Molded Articles

The thermoplastic molding compounds may be produced for example when the respective constituents (components) are in familiar fashion mixed and melt-compounded and melt-extruded at temperatures of preferably 200° C. to 320° C., particularly preferably at 220° C. to 290° C., very particularly preferably at 230° C. to 270° C., in customary apparatuses such as internal kneaders, extruders and twin-screw extruders for example. In the context of the present invention this process is generally referred to as compounding.

The term "molding compound" is to be understood as meaning the product obtained when the respective components are melt-compounded and melt-extruded.

The mixing of the individual constituents of the molding compound may be carried out in a known manner, either successively or simultaneously, either at about 20° C. (room temperature) or at a higher temperature. This means that, for example, some of the constituents may be introduced via the main intake of an extruder and the remaining constituents may be introduced later in the compounding process via a side extruder.

The molding compounds of the invention may be used to produce molded articles of any kind. These may be produced by injection molding, extrusion and blow molding processes for example. A further form of processing is the production of molded articles by thermoforming from previously produced sheets or films. The molding compounds according to the invention are particularly suitable for processing by injection molding, extrusion, blow molding and thermoforming methods. Injection molding is most preferred.

The constituents of the molding compound may also be metered directly into an injection molding machine or into an extrusion apparatus and processed into molded articles.

Examples of such molded articles that are producible from the molding compound of the invention are films, profiles, housing parts of any kind, for example for domestic appliances such as juice presses, coffee machines, mixers; for office machinery such as monitors, flatscreens, notebooks, printers, copiers; sheets, pipes, electrical installation ducts, windows, doors and other profiles for the construction sector (interior fitout and exterior applications) and also electrical and electronic components such as switches, plugs and sockets, and parts for commercial vehicles, in particular for the automotive sector. The compositions and molding compounds according to the invention are also suitable for producing the following molded articles or moldings: interior fitout parts for rail vehicles, ships, aircraft, buses and other motor vehicles, bodywork components for motor vehicles, housings of electrical equipment containing small transformers, housings for equipment for the processing and transmission of information, massage equipment and housings therefor, toy vehicles for children, two-dimensional wall elements, housings for safety equipment, thermally insulated transport containers, molded parts for sanitation and bath equipment, protective grilles for ventilation openings and housings for garden equipment. The molding compounds according to the invention are particularly suitable for production of housings and facings for medical devices.

The molding compounds are especially suitable for automotive parts that undergo relative motion with respect to one another, such as lids, trays, pull-out cup holders, parts that are snap-fitted together such as trim, plastic parts around the seat, etc.

EXAMPLES

Component A:
Bisphenol-A-based linear polycarbonate having a weight-average molecular weight Mw of 26 000 g/mol (determined by GPC in methylene chloride using a polycarbonate standard).

Component B-1a:
Acrylonitrile(A)-butadiene(B)-styrene(S) polymer produced by the bulk polymerization method, containing a disperse phase composed of rubber particles that have been grafted with styrene-acrylonitrile copolymer and are based on pure polybutadiene rubber as graft base, containing inclusions of styrene-acrylonitrile copolymer and a styrene-acrylonitrile copolymer matrix not bonded to the rubber.

Component B-1a has an A:B:S ratio of 23:9:68% by weight and a gel content, determined as the acetone-insoluble proportion, of 20% by weight. The tetrahydrofuran-soluble styrene-acrylonitrile copolymer in component B-1a has a weight-average molecular weight $M_w$, (measured by GPC in tetrahydrofuran as the solvent using a polystyrene standard) of 160 kg/mol. The median particle size of the disperse phase D50, measured by ultracentrifugation, is 0.9 µm. The melt flow rate (MFR) of component B-1a, measured according to ISO 1133 (2012 version) at 220° C. with an applied load of 10 kg, is 6.5 g/10 min.

Component B-1b:
Acrylonitrile(A)-butadiene(B)-styrene(S)-n-butyl acrylate(BA) polymer produced by the bulk polymerization method, containing a disperse phase composed of rubber particles that have been grafted with styrene-acrylonitrile-n-butyl acrylate copolymer and are based on pure polybutadiene rubber as graft base, containing inclusions of styrene-acrylonitrile-n-butyl acrylate copolymer and a styrene-acrylonitrile-n-butyl acrylate copolymer matrix not bonded to the rubber. Component B-1b has an A:B:S:BA ratio of 22.5:10:63:4.5% by weight and a gel content, determined as the proportion insoluble in acetone, of 19% by weight. The tetrahydrofuran-soluble, styrene-acrylonitrile-n-butyl acrylate copolymer in component B-1b has a weight-average molecular weight $M_w$ (measured by GPC in tetrahydrofuran as the solvent using a polystyrene standard) of 115 kg/mol. The median particle size of the disperse phase D50, measured by ultracentrifugation, is 0.5 µm. The melt flow rate (MFR) of component B-1b, measured according to ISO 1133 (2012 version) at 220° C. with an applied load of 10 kg, is 28 g/10 min.

Component B-2:
ABS emulsion polymer having an acrylonitrile: butadiene: styrene weight ratio of 12:57:31% by weight and a median particle size d50 of the graft substrate of 340 nm determined by ultracentrifugation. The rubber particles do not contain any inclusions.

Component C:
Dow Corning™ HMB-1903 Masterbatch (Dow Chemical).

Component D-1:
Heat stabilizer, Irganox™ B900, (mixture of 80% Irgafos™ 168 (tris(2,4-di-tert-butyl-phenyl)phosphite) and 20% Irganox™ 1076 (2,6-di-tert-butyl-4-(octadecanoxycarbonylethyl)phenol) (BASF)).

Component D-2:
Irganox™ 1076, 2,6-di-tert-butyl-4-(octadecanoxycarbonylethyl)phenol (BASF).

Component D-3:
Pentaerythritol tetrastearate as lubricant/demolding agent.

Component D-4:
Black Pearls 800 (Cabot GmbH).

The comparative examples employ Bayblend® T85 XF (Covestro Deutschland AG). This is a blend of polycarbonate and an acrylonitrile-butadiene-styrene copolymer (ABS) having a B1:B2 weight ratio of less than 1.

Sled Samples:
Makrolon® M2600 (Covestro Deutschland AG), a linear polycarbonate based on bisphenol-A having a weight-average molecular weight Mw of 26 000 g/mol (determined by GPC in methylene chloride using a polycarbonate standard), and a polymethyl methacrylate (PMMA) (Plexiglas™ 8N, Evonik Industries AG).

Production and Testing of the Molding Compounds According to the Invention

The components were mixed on a Werner & Pfleiderer ZSK-25 twin-screw extruder at a melt temperature of 260° C. The moldings were melted at a melt temperature of 260° C. or 300° C. (for Makrolon® M2600) and 250° C. (for Plexiglas™ 8N) and a mold temperature of 80° C. or 70° C. (for Plexiglas™ 8N) on an Arburg 270 E injection molding machine.

Material pair testing to determine stick-slip risk was carried out on a stick-slip test rig (SSP-04) from ZIEGLER-Instruments GmbH (VDA 230-206; 2005).

The risk priority number (RPN) is used as a measure for stick-slip propensity (stick-slip). It describes the propensity of a material pairing having a propensity for stick-slip under the specified conditions. The RPN may assume a value from 1 to 10. An RPN between 1 and 3 is considered non-critical for the evaluation of a material pairing, i.e. stick-slip is not to be expected under the tested conditions. At an RPN of 4 to 5 the material pairing is in a borderline range. Audible noise from the stick-slip effect cannot be ruled out. If the RPN is greater than 6, the material pairing is critical with regard to the stick-slip effect and audible noise is to be expected.

The principle of the stick-slip measurement is based on setting two samples into relative motion with respect to one another under the influence of a normal force (40N) and at a predefined speed (1 mm/s). The selected material surfaces are thus rubbed against one another in a "shearing" manner. The test rig is composed of a motive unit, the flat sled and a force unit, a leaf spring fitted with a round sample carrier. The sled sample (60 mm×70 mm) and spring sample (30 mm×50 mm) are mounted using double-sided adhesive tape. By means of a pneumatic drive the spring sample is advanced against the sled sample at a predefined normal force and the sled is subsequently set into a linear oscillatory motion by an electric motor. The oscillatory motion of the sled has a displacement path (test distance) of 20 mm. The alternation between sticking and sliding is responsible for the generation of stick-slip-related noise.

The sled samples used are polycarbonate and PMMA and the spring examples used are inventive molding compounds and comparative molding compounds based on Bayblend® T85 XF.

TABLE 1

Composition of the molding compounds

| Components [parts by wt.] | 1 (comp.) | 2 (comp.) | 3 | 4 |
|---|---|---|---|---|
| Bayblend ® T85 XF | 96.00 | 94.00 | — | — |
| A | — | — | 65.66 | 63.66 |
| B-1a | — | — | 24.00 | 24.00 |
| B-1b | — | — | 3.84 | 3.84 |
| B-2 | — | — | 0.96 | 0.96 |
| C | 4.00 | 6.00 | 4.00 | 6.00 |
| D-1 | — | — | 0.10 | 0.10 |
| D-2 | — | — | 0.20 | 0.20 |
| D-3 | — | — | 0.74 | 0.74 |
| D-4 | — | — | 0.50 | 0.50 |

TABLE 2

Results of stick-slip testing

| Spring sample | Sled sample | Force (N) | Sled speed (mm/s) | RPN |
|---|---|---|---|---|
| 1 (cf.) | Makrolon ® | 40 | 1 | 7 |
| 3 | M2600 | 40 | 1 | 2 |
| 1 (cf.) | Plexiglas ™ 8N | 40 | 1 | 6 |
| 3 | | 40 | 1 | 3 |
| 2 (cf.) | | 40 | 1 | 6 |
| 4 | | 40 | 1 | 3 |

It is apparent from table 2 that, in contrast to the comparative examples 1 and 2, only the inventive compositions according to examples 3 and 4 (table 1) achieve the object of the invention, i.e. only the inventive compositions 3 and 4 exhibit a risk priority number (RPN) in the non-critical range and thus exhibit a low propensity for stick-slip and noise.

The invention claimed is:

1. A thermoplastic molding compound containing
   A) at least one polymer selected from the group consisting of polycarbonate and polyester carbonate,
   B) a polymer containing
      B1) at least one rubber-modified vinyl (co) polymer containing
         B1.1) 80% to 95% by weight, based on B.1, of at least one vinyl monomer and
         B1.2) 5% to 20% by weight, based on B1, of one or more elastomeric polybutadiene-containing graft substrates,
      wherein B1
   contains polybutadiene-containing rubber particles grafted with the vinyl monomers B1.1
      which contain inclusions of vinyl (co) polymer consisting of the vinyl monomers B1.1 and
   a vinyl (co) polymer matrix consisting of the vinyl monomers B1.1 which is not bonded to these rubber particles and not included in rubber particles,
   wherein component B1 is a mixture of two rubber-modified vinyl (co) polymers and wherein in the first of these rubber-modified vinyl (co) polymers the vinyl monomer B.1.1 is a mixture of styrene and acrylonitrile and wherein in the second of these rubber-modified vinyl (co) polymers, the vinyl monomer B.1.1 is a mixture of styrene, acrylonitrile and butyl acrylate, and
   B2 further rubber particles grafted with vinyl monomers composed of
      B2.1) 5% to 75% by weight, based on B.2, of at least one vinyl monomer and
      B2.2) 25% to 95% by weight, based on B2, of one or more elastomeric graft substrates,
   wherein the weight ratio of component B1) to B2) is at least 5:1,
   C) a masterbatch solid at room temperature containing
      C1) one or more copolymers containing structural units derived from an olefin and structural units derived from a polar comonomer,
      C2) a vulcanized silicone elastomer.

2. The molding compound as claimed in claim 1, wherein the polybutadiene-containing rubber particles grafted with vinyl monomers B1.1 present in component B1 have an average particle diameter D50 measured by ultracentrifugation of 0.5 to 1.5 μm.

3. The molding compound as claimed in claim 1, wherein component B1 has a polybutadiene content of 7% to 15% by weight.

4. The molding compound as claimed in claim 1, wherein component B1 is produced by a bulk polymerization process.

5. The molding compound as claimed in claim 1, wherein component B2 is produced by an emulsion polymerization process.

6. The molding compound as claimed in claim 1, wherein the polybutadiene content is 2 to 7% by weight based on the molding compound.

7. The molding compound as claimed in claim 1, wherein component C1 is a copolymer containing structural units derived from ethylene and an acrylate and wherein the proportion of structural units derived from an acrylate in component C1 is 6% to 12% by weight.

8. The molding compound as claimed in claim 1, wherein component C contains 40 to 80% by weight of component C1 and 20 to 60% by weight of component C2.

9. The molding compound as claimed in claim 1, containing 50-80% by weight of component A, 10-40% by weight of component B, 1-10% by weight of component C.

10. The molding compound as claimed in claim 1, wherein component C is produced by dynamic vulcanization, wherein the vulcanized silicone elastomer C2 is dispersed in the thermoplastic matrix C1 by a mixing process.

11. The molding compound as claimed in claim 1, further containing as component D at least one additive selected from the group consisting of flame retardants, lubricants and demolding agents, stabilizers, flow promoters, compatibilizers, and dyes, and pigments.

12. A process for producing a molding compound as claimed in claim 1, wherein the components A to C and optionally component D comprising one or more polymer additives are mixed with one another at a temperature of 200° C. to 320° C. and subsequently cooled and pelletized.

13. A molded article obtainable from the molding compound as claimed in claim 1.

* * * * *